United States Patent
Sugizaki

(10) Patent No.: US 8,051,251 B2
(45) Date of Patent: Nov. 1, 2011

(54) METHOD AND APPARATUS FOR SETTING STATUS OF CACHE MEMORY

(75) Inventor: Go Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 580 days.

(21) Appl. No.: 12/230,178

(22) Filed: Aug. 25, 2008

(65) Prior Publication Data

US 2008/0320238 A1 Dec. 25, 2008

Related U.S. Application Data

(63) Continuation of application No. PCT/JP2006/303436, filed on Feb. 24, 2006.

(51) Int. Cl.
*G06F 12/00* (2006.01)
(52) U.S. Cl. .................. 711/145; 711/144; 711/146
(58) Field of Classification Search .................. 711/146, 711/141, 144, 145, 119
See application file for complete search history.

(56) References Cited

U.S. PATENT DOCUMENTS

| | | | | |
|---|---|---|---|---|
| 5,522,058 | A | * | 5/1996 | Iwasa et al. .................. 711/145 |
| 5,537,569 | A | * | 7/1996 | Masubuchi .................. 711/121 |
| 5,940,864 | A | | 8/1999 | Arimilli et al. |
| 6,115,804 | A | | 9/2000 | Carpenter et al. |
| 6,128,707 | A | * | 10/2000 | Arimilli et al. ............... 711/143 |
| 6,138,218 | A | * | 10/2000 | Arimilli et al. ............... 711/146 |
| 6,275,909 | B1 | * | 8/2001 | Arimilli et al. ............... 711/146 |
| 6,457,100 | B1 | | 9/2002 | Ignatowski et al. |
| 6,751,705 | B1 | * | 6/2004 | Solomon et al. .............. 711/122 |
| 6,976,131 | B2 | * | 12/2005 | Pentkovski et al. ........... 711/146 |

FOREIGN PATENT DOCUMENTS

| | | |
|---|---|---|
| JP | 09-0221381 A | 1/1997 |
| JP | 9-204405 | 8/1997 |
| JP | 10-289154 | 10/1998 |
| JP | 10-289155 | 10/1998 |
| JP | 10-289156 | 10/1998 |
| JP | 10-289157 | 10/1998 |
| JP | 11-272557 | 10/1999 |
| JP | 11-328026 A | 11/1999 |
| JP | 11-328027 | 11/1999 |

(Continued)

OTHER PUBLICATIONS

Japanese Office Action issued on Apr. 2, 2009 in corresponding Japanese Patent Application 2008-50135.

(Continued)

*Primary Examiner* — Hong Kim
(74) *Attorney, Agent, or Firm* — Fujitsu Patent Center

(57) ABSTRACT

One aspect of the embodiments utilizes a system controller which has a broadcast transmitting and receiving unit that receives a memory access request from each of CPU and notifies to the other system controllers and a snoop control unit that judges when the memory access request from any of the CPUs for each of the cache memories in the CPU is received, whether object data conflicts with object data requested by a prior access request received earlier than the memory access request and whether the object data is present in any of the cache memories, selects the status of the cache memory of the CPU, notifies the other system controller of a snoop processing result in which the status selected and the cache memory are associated, and set a final status as the status of the system controller based on priority of each status of other system controllers.

6 Claims, 7 Drawing Sheets

| FINAL STATUS | SHARED FETCH REQUEST | EXCLUSIVE FETCH REQUEST | STORE REQUEST |
|---|---|---|---|
| BUSY<br>HIT&BUSY<br>MISS&BUSY | RETRY SNOOP | RETRY SNOOP | RETRY SNOOP |
| HIT | REQUEST ONE OF HIT CACHE MEMORIES TO TRANSMIT DATA | REQUEST ONE OF HIT CACHE MEMORIES TO TRANSMIT DATA AND INVALIDATE REMAINING CACHE MEMORIES | INVALIDATE HIT CACHE MEMORIES AND START STORAGE IN MAIN MEMORY |
| MISS | START READ FROM MAIN MEMORY | START READ FROM MAIN MEMORY | START STORAGE IN MAIN MEMORY |

FOREIGN PATENT DOCUMENTS

| | | |
|---|---|---|
| JP | 2000-227908 | 8/2000 |
| JP | 2000-242621 | 8/2000 |
| JP | 2000-250884 | 9/2000 |
| JP | 2004-505346 A | 2/2004 |
| WO | WO 02/08909 A1 | 1/2002 |

OTHER PUBLICATIONS

Japanese Office Action issued Apr. 2, 2009 in corresponding Japanese Patent Application 2008-501535.

European Search Report mailed Nov. 4, 2009 and issued in corresponding European Patent Application 06714575.5.

* cited by examiner

FIG.3

| CACHE LINE INFORMATION | MAIN MEMORY INFORMATION | CACHE LINE STATE INFORMATION |
|---|---|---|
| CML #A1 | | INVALID |
| CML #A2 | ADa | UPDATE/EXCLUSIVE |
| ⋮ | ⋮ | ⋮ |
| CML #B1 | ADb | UNCHANGED/SHARED |
| CML #B2 | ADc | UNCHANGED/EXCLUSIVE |
| ⋮ | ⋮ | ⋮ |

FIG.4

| STATUS | SELECTION CONDITION |
|---|---|
| BUSY | OBJECT DATA OF OBJECT MEMORY ACCESS REQUEST AND OBJECT DATA OF PRIOR MEMORY ACCESS REQUEST CONFLICT WITH EACH OTHER |
| HIT | OBJECT DATA OF OBJECT MEMORY ACCESS REQUEST IS PRESENT IN CACHE MEMORIES, OBJECT DATA OF OBJECT MEMORY ACCESS REQUEST AND PRIOR MEMORY ACCESS DATA DO NOT CONFLICT WITH EACH OTHER, AND RESOURCES FOR DATA TRANSFER ARE NOT EXHAUSTED |
| HIT&BUSY | OBJECT DATA OF OBJECT MEMORY ACCESS REQUEST IS PRESENT IN CACHE MEMORIES, OBJECT DATA OF OBJECT MEMORY ACCESS REQUEST AND OBJECT DATA OF MEMORY ACCESS REQUEST DO NOT CONFLICT WITH EACH OTHER, AND RESOURCES FOR DATA TRANSFER ARE EXHAUSTED |
| MISS&BUSY | OBJECT DATA OF OBJECT MEMORY ACCESS REQUEST IS NOT PRESENT IN CACHE MEMORIES, OBJECT DATA OF OBJECT MEMORY ACCESS REQUEST AND OBJECT DATA OF PRIOR MEMORY ACCESS REQUEST DO NOT CONFLICT WITH EACH OTHER, IT IS LIKELY THAT THERE IS CONFLICT WITH OBJECT DATA OF OBJECT MEMORY ACCESS REQUEST DEPENDING ON FINAL STATUS OF PRIOR MEMORY ACCESS REQUEST |
| MISS | OBJECT DATA OF OBJECT MEMORY ACCESS REQUEST AND OBJECT DATA OF PRIOR MEMORY ACCESS REQUEST DO NOT CONFLICT WITH EACH OTHER AND OBJECT DATA OF OBJECT MEMORY ACCESS REQUEST IS NOT PRESENT IN CACHE MEMORIES |

FIG.5

| FINAL STATUS | SHARED FETCH REQUEST | EXCLUSIVE FETCH REQUEST | STORE REQUEST |
|---|---|---|---|
| BUSY<br>HIT&BUSY<br>MISS&BUSY | RETRY SNOOP | RETRY SNOOP | RETRY SNOOP |
| HIT | REQUEST ONE OF HIT CACHE MEMORIES TO TRANSMIT DATA | REQUEST ONE OF HIT CACHE MEMORIES TO TRANSMIT DATA AND INVALIDATE REMAINING CACHE MEMORIES | INVALIDATE HIT CACHE MEMORIES AND START STORAGE IN MAIN MEMORY |
| MISS | START READ FROM MAIN MEMORY | START READ FROM MAIN MEMORY | START STORAGE IN MAIN MEMORY |

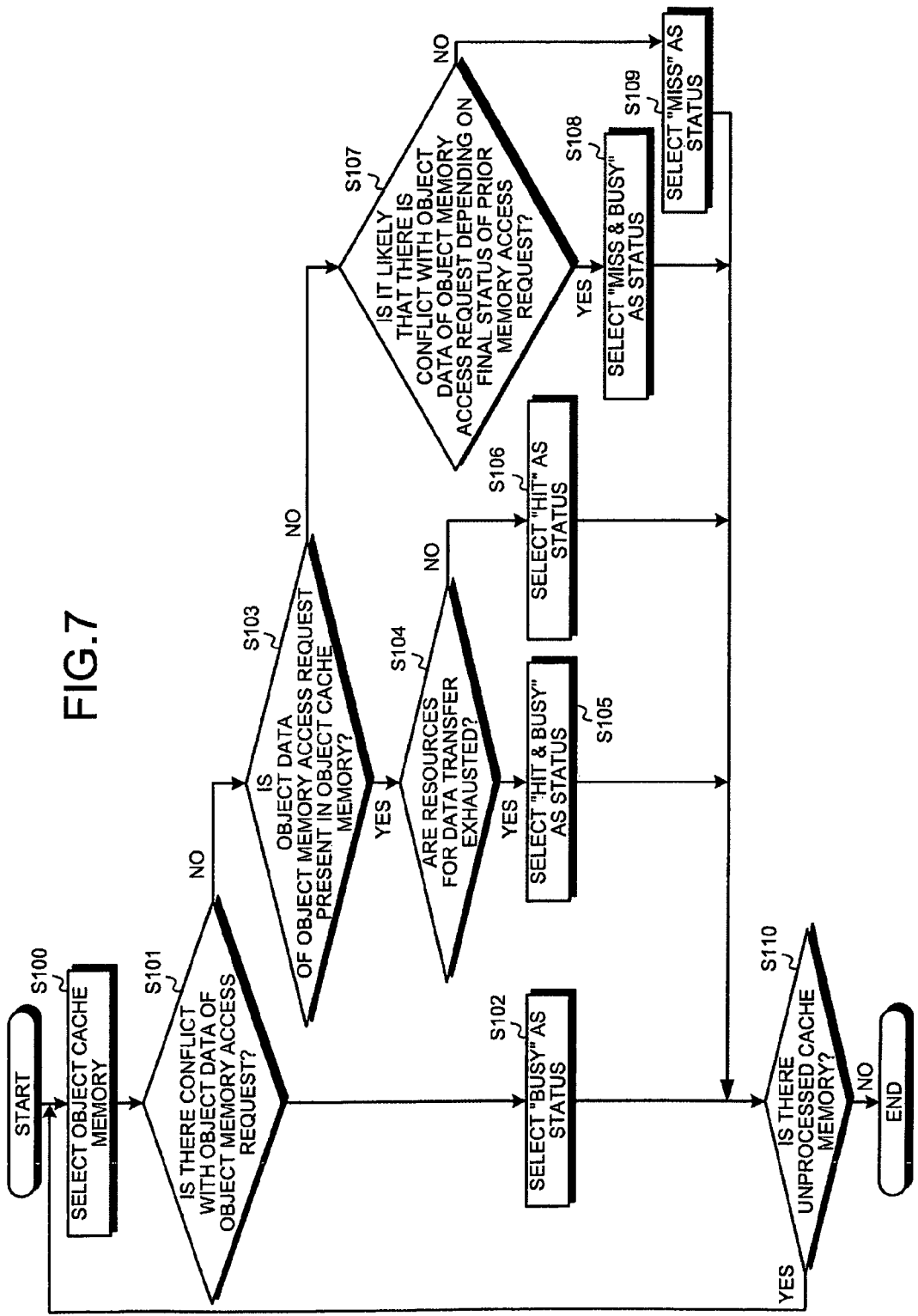

METHOD AND APPARATUS FOR SETTING STATUS OF CACHE MEMORY

This application is a continuing application, filed under 35 U.S.C. §111(a), of International Application PCT/JP2006/303436, filed Feb. 24, 2006.

BACKGROUND

1. Fields

The present invention relates to an information processing apparatus of a multiprocessor configuration having cache memories, and, more particular to a snoop control method and an information processing apparatus for reducing time for processing a memory access request.

2. Description of the Related Art

Conventionally, various technologies for quickly executing a memory access request in information processing apparatuses of a multiprocessor configuration having cache memories have been devised. For example, in the conventional technology described in Japanese Laid-open Patent Publication No. 1999-328026, a local processor automatically updates an invalid data item, which is stored in cache memories in relation to an effective address tag, with valid data without issuing an explicit reading or writing request by adding anew, as states of cache memories, a hovering state indicating that an address tag is valid but a data item stored in a corresponding way of a data array is invalid and a recent state indicating which cache memory among a plurality of cache memories that store copies of data items has recently received shared data via a transaction on a mutual connection line in addition to a change state, an exclusive state, a shared state, and an invalid state of a normal cache protocol (an MESI protocol, etc.).

Consequently, data invalidated by an activity of a remote processor is refreshed before the data is accessed by the local processor. Therefore, it is unnecessary to retrieve data from a remote cache memory or a system memory and it is possible to reduce waiting time for access to the cache memory or the system memory.

It is assumed that, in an information processing apparatus of a multiprocessor configuration having shared memories including a plurality of processors, which have cache memories, a plurality of input/output devices, and a plurality of memory devices (main memories), the processors, the input/output devices, and the main memories are divided into a plurality of groups and a system controller that manages the processors, the input/output devices, and the main memories is provided for each of the groups.

When the system controller receives a memory access request from a processor managed by the system controller, the system controller notifies other system controllers of the memory access request. The respective system controllers execute snoop processing for detecting states of data stored in cache memories in processors managed by the system controllers and states of resources (control buses, address buses, and data buses for chip select signals, read/write control signals, and the like sent to the cache memories) used for data transfer and selecting statuses of the cache memories with respect to data (object data) requested by the memory access request.

Each of the system controllers notifies the other system controllers of the status of each of the cache memories selected by the snoop processing as a snoop processing result, merges statuses of all the cache memories in the apparatus to determine a final status, and executes memory access start processing for starting memory access processing for inter-memory data transfer among the cache memories or between the cache memories and the main memories based on the determined final status.

In such a conventional information processing apparatus, three statuses, i.e., "BUSY" indicating that data transfer of object data is impossible, "HIT" indicating that data transfer of object data is possible, and "MISS" indicating that object data is not present in cache memories are defined. The system controller selects "BUSY" as a status when the system controller detects that data requested by a memory access request set as an object of the snoop processing (an object memory access request) (object data) and object data of a memory access request set as an object of memory access start processing and memory access processing, i.e., a memory access request issued before the object memory access request and set as an object of the memory access start processing and the memory access processing (a prior memory access request) conflict with each other or resources for data transfer are exhausted.

The system controller selects "HIT" when the system controller detects that the object data is present in the cache memories of the processor, the object data does not conflict with the object data of the object memory access request, and the resources for data transfer are not exhausted. The system controller selects "MISS" when the system controller detects that the object data is not present in the cache memories of the processor and the resources for data transfer are not exhausted.

The system controller sets the final status as "BUSY" when "BUSY" is present in statuses of all the cache memories, sets the final status as "HIT" when "BUSY" is not present and "HIT" is present, and sets the final status as "MISS" when all the statuses are "MISS". In other words, the status "BUSY" has highest priority and the status "HIT" and the status "MISS" have lower priority in this order. The system controller sets a status having highest priority among all the statuses as the final status.

The system controller retries the snoop processing when the final status is "BUSY". When the final status is "HIT" and the memory access request is a shared fetch request for referring to the object data, the system controller starts memory access processing for requesting one of the cache memories, for which "HIT" is selected as a status, to perform data transfer. When the final status is "HIT" and the memory access request is an exclusive fetch request based on a premise that the object data is updated, the system controller starts memory access processing for requesting one of the cache memories, for which "HIT" is selected as a status, to perform data transfer and invalidating the other cache memories, for which "HIT" is selected as s status. When the final status is "HIT" and the memory access request is a store request for storing data, the system controller starts memory access processing for invalidating all the cache memories, for which "HIT" is selected as a status, and storing the object data in the main memories. When the final status is "MISS" and the memory access request is the shared fetch request or the exclusive fetch request, the system controller starts memory access processing for reading data from the main memories. When the final status is "MISS" and the memory access request is the store request, the system controller starts the memory access processing for storing the object data in the main memories.

It is assumed that a status of a certain cache memory is "BUSY" and a status of at least one of the other cache memories is "HIT". The system controller determines "BUSY" having the highest priority as the final status. As described above, "BUSY" is selected as a status when there is a conflict of the object data or the resources for data transfer are exhausted. When "BUSY" is selected because of the conflict of the object data, it is likely that data of the cache memories is changed by the memory access processing for the prior memory access request. Therefore, it is necessary to retry the snoop processing until the memory access processing for the prior memory access request is finished and states of the cache memories are fixed.

On the other hand, when there is no conflict of the object data and "BUSY" is selected as a status because the resources for data transfer are exhausted, access to the cache memories is impossible. However, because there is no conflict of the object data, even if the memory access processing for the prior memory access request is executed, data in areas of the cache memories that store the object data of the object memory access request is not updated. In other words, states of the cache memories in areas concerning the object data of the object memory access request are not changed. Therefore, it is possible to use data stored in the cache memories, for which "HIT" is selected as a status.

However, in the conventional information processing apparatus, there is a problem in that, when at least one cache memory, for which "BUSY" is selected as a status, is present in all the cache memories, the final status is "BUSY" and, even when usable data is actually present, retry of the snoop processing occurs, waiting time for access to the cache memories increases, and, as a result, processing time for a memory access request increases.

SUMMARY

It is an object of the present invention to at least partially solve the problems in the conventional technology.

According to an aspect of the present invention, a snoop control method is applied to an information processing apparatus including main memories and system controllers connected to CPUs having cache memories. The snoop control method of the system controller includes receiving a memory access request from any of the CPUs and notifying other system controllers of the memory access request; judging, when the memory access request from any of the CPUs for each of the cache memories in the CPU is received, whether object data requested by the memory access request conflicts with object data requested by a prior access request received earlier than the memory access request and whether the object data requested by the memory access request is present in any of the cache memories; selecting the status of the cache memory of the CPU; notifying the other system controller of a snoop processing result in which the status selected at the selecting and the cache memory are associated; and setting a final status as the status of the system controller based on priority of each status of other system controllers included in the information processing apparatus.

According to another aspect of the present invention, an information processing apparatus includes main memories and system controllers connected to CPUs having cache memories. Each of the system controllers includes a broadcast transmitting and receiving unit that receives a memory access request from each of the CPU and notifies the memory access request to the other system controllers; and a snoop control unit that judges when the memory access request from any of the CPUs for each of the cache memories in the CPU is received, whether object data requested by the memory access request conflicts with object data requested by a prior access request received earlier than the memory access request and whether the object data requested by the memory access request is present in any of the cache memories, selects the status of the cache memory of the CPU, notifies the other system controller of a snoop processing result in which the status selected at the selecting and the cache memory are associated, and set a final status as the status of the system controller based on priority of each status of other system controllers included in the information processing apparatus.

According to still another aspect of the present invention, a system controller is connected to a main memory and CPUs having cache memories, and includes a broadcast transmitting and receiving unit that receives a memory access request from each of the CPU and notifies the memory access request to the other system controllers; and a snoop control unit that judges when the memory access request from any of the CPUs for each of the cache memories in the CPU is received, whether object data requested by the memory access request conflicts with object data requested by a prior access request received earlier than the memory access request and whether the object data requested by the memory access request is present in any of the cache memories, selects the status of the cache memory of the CPU, notifies the other system controller of a snoop processing result in which the status selected at the selecting and the cache memory are associated, and set a final status as the status of the system controller based on priority of each status of other system controllers included in the information processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of the structure of a cache management table shown in FIG. 2;

FIG. 4 is a diagram of kinds of statuses selected by a snoop control unit shown in FIG. 2 and selection conditions;

FIG. 5 is a diagram for explaining final statuses and operations of memory access processing started according to kinds of memory access requests;

FIG. 7 is a flowchart for explaining operations of snoop processing of the information processing apparatus in the present invention.

DETAILED DESCRIPTION OF THE PREFERRED EMBODIMENTS

Embodiments of a snoop control method and an information processing apparatus in the present invention are explained in detail below with reference to the drawings. The present invention is not limited by the embodiments.

Figure 1:
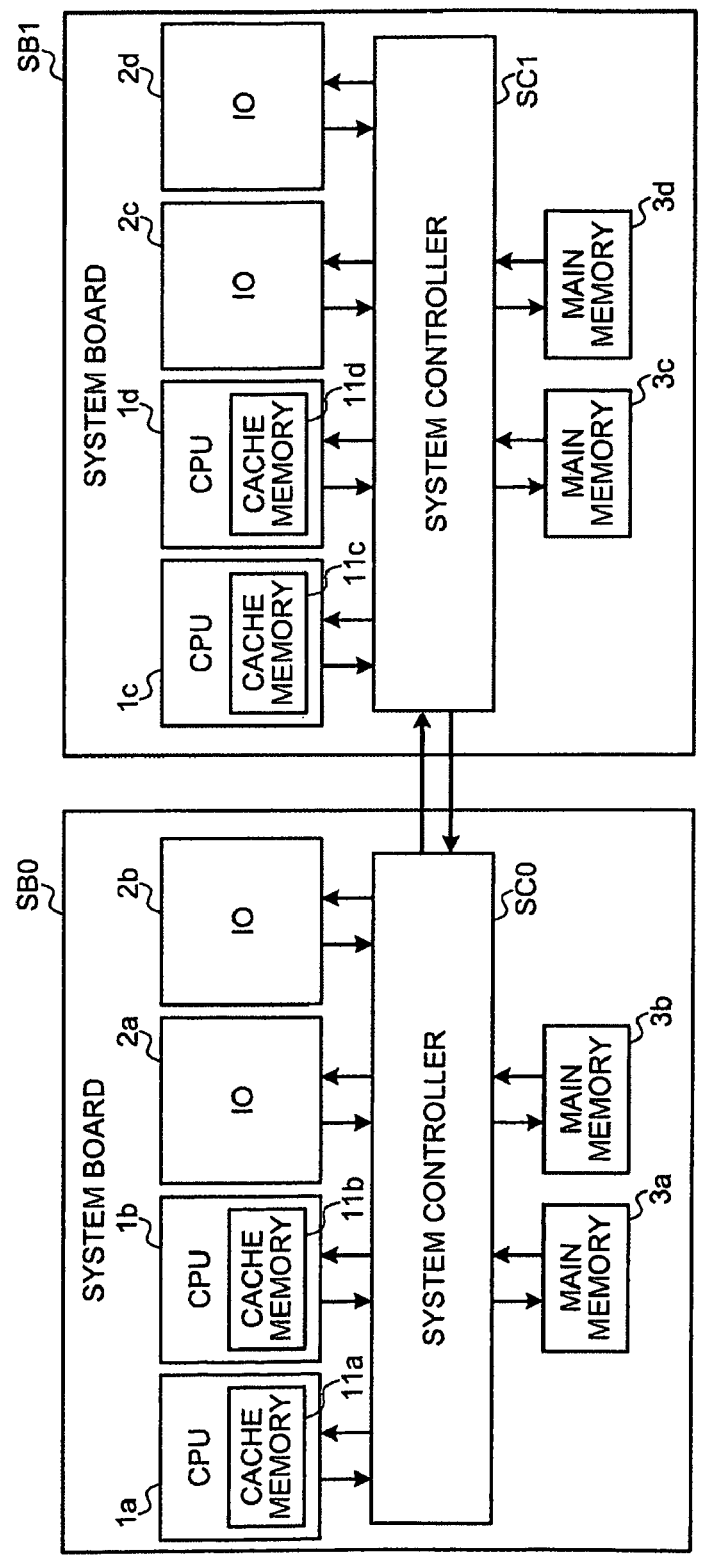
FIG. 1 is a diagram of a configuration of an information processing apparatus in the present invention.

An embodiment of the information processing apparatus in the present invention is explained referring to FIGS. 1 to 7. FIG. 1 is a diagram of a configuration of the information processing apparatus in the present invention. In FIG. 1, the information processing apparatus includes a plurality of (in this case, two) system boards SB0 and SB1 connected by a bus.

The system board SB0 includes CPUs 1a and 1b having cache memories 11a and 11b, input/output devices (hereinafter, "IO devices") 2a and 2b, main memories 3a and 3b, and a system controller SC0. The system board SB1 includes CPUs 1c and 1d having cache memories 11c and 11d, IO devices 2c and 2d, main memories 3c and 3d, and a system controller SC1.

The main memory 3 (indicating 3a to 3d) includes a memory device that has a storage capacity larger than that of the cache memory 11 (indicating 11a to 11d) and access speed lower than that of the cache memory 11. The main memory 3 is used as a shared memory of the information processing apparatus and stores data including a program executed by the CPU 1 (indicating 1a to 1d).

The cache memory 11 includes a memory device that has a storage capacity smaller than that of the main memory 3 and access speed higher than that of the main memory 3. The cache memory 11 stores a part of data stored by the main memory 3 in data transfer between the cache memories 11 or between the cache memory 11 and the main memory 3 executed according to a memory access request issued by the CPU 1.

The system controller SC (indicating SC0 and SC1) manages the CPU 1, the IO device 2, and the main memory 3 mounted on the system board SB (indicating SB0 and SB1) on which the system controller SC is mounted. In FIG. 1, the system controller SC0 manages the CPUs 1a and 1b, the IO devices 2a and 2b, and the main memories 3a and 3b and the system controller SC1 manages the CPUs 1c and 1d, the IO devices 2c and 2d, and the main memories 3c and 3d.

The system controller SC manages a state of the cache memory 11 in the CPU 1 based on, for example, a cache protocol decided in advance such as a MESI protocol or a MOESI protocol and controls data transfer between the cache memories 11 and between the cache memory 11 and the main memory 3 according to a memory access request from the CPU 1 or the IO device 2 while keeping coherence between the cache memories 11.

Figure 2:
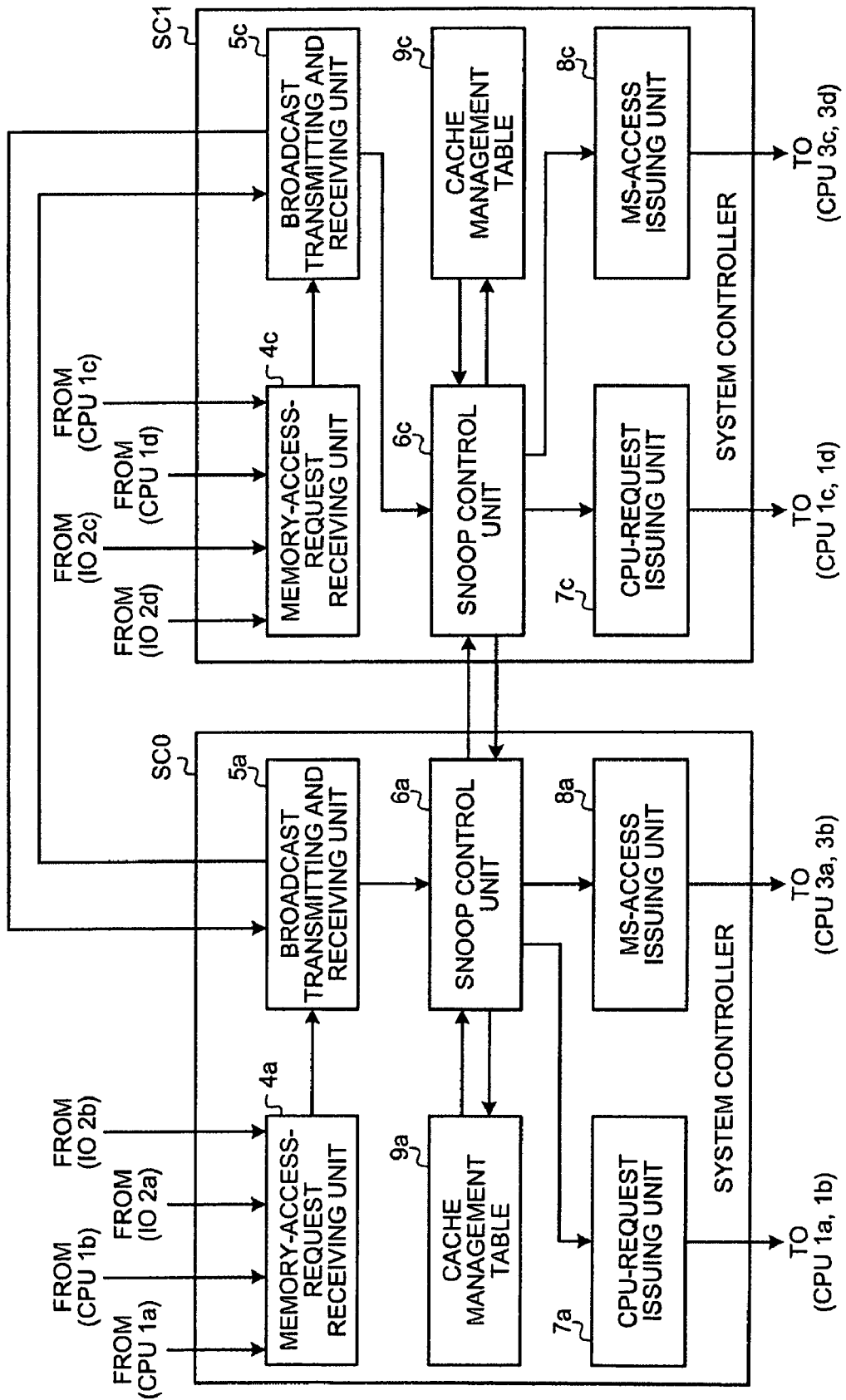
FIG. 2 is a block diagram of a configuration of a system controller shown in FIG. 1.

FIG. 2 is a block diagram of a configuration of the system controller SC concerning the start of memory access processing in the data transfer according to the memory access request from the CPU 1 or the IO device 2. In FIG. 2, the system controller SC0 includes a memory-access-request receiving unit 4a, a broadcast transmitting and receiving unit 5a, a snoop control unit 6a, a CPU-request issuing unit 7a, an MS-access issuing unit 8a, and a cache management table 9a. The system controller SC1 includes a memory-access-request receiving unit 4c, a broadcast transmitting and receiving unit 5c, a snoop control unit 6c, a CPU-request issuing unit 7c, an MS-access issuing unit 8c, and a cache management table 9c.

In the cache management table 9 (indicating 9a and 9c), states of the cache memory 1 of the CPU 1 managed by the system controller SC, on which the cache management table 9 is mounted, are registered. The states of the cache memory 11 are used for judgment on whether data requested by the memory access request is present in the cache memory 11.

Data transfer between the cache memories 11 and data transfer from the cache memory 11 to the main memory 3 are executed in cache line units. Data transfer from the main memory 3 to the cache memory 11 is executed in entry units. The number of bytes of an entry and the number of bytes of a cache line are set in advance such that "number of bytes of an entry=number of bytes of a cache line×n (n is a natural number)" holds. Therefore, the states of the cache memory 11 are managed for each of cache lines.

FIG. 3 is a diagram of an example of the structure of the cache management table 9a. In FIG. 3, in the cache management table 9a, in association with sub-block information in which cache line identifiers for identifying cache lines of the cache memories 11a and 11b are registered, main memory information that indicates association between data stored by the cache lines and data of the main memory 3 and cache line state information that indicates a state (valid/invalid) of the data stored by the cache lines are registered.

In the cache management table 9a shown in FIG. 3, the MESI protocol is used as a cache protocol. As cache line states, the cache management table 9a has four states, i.e., "invalid" indicating that a valid state is not stored in a cache line, "updated/exclusive" indicating a state in which data stored by cache lines is updated and a copy of the data is not present in cache lines of the other cache memories 11 and the main memories 3, "unchanged/exclusive" indicating a state in which data stored by cache lines is unchanged and a copy of the data is not present in cache lines of the other cache memories 11, and "unchanged/shared" indicating that data stored by cache lines is unchanged and a copy of the data is present in cache lines of the other cache memories 11. In this case, "invalid" means that data stored by a cache memory is "invalid". "updated/exclusive", "unchanged/exclusive,", and "unchanged/shared" mean that data stored by cache lines is "valid".

Referring back to FIG. 2, the memory-access-request receiving unit 4 (indicating 4a and 4c) receives memory access requests issued by the CPU 1 and the IO device 2 managed by the system controller SC on which the memory-access-request receiving unit 4 is mounted. The memory-access-request receiving unit 4 outputs the received memory access requests to the broadcast transmitting and receiving unit 5.

The broadcast transmitting and receiving unit 5 (indicating 5a and 5c) has a communication interface between the system controllers SC. The broadcast transmitting and receiving unit 5 outputs the memory access request input from the memory-access-request receiving unit 4 to the snoop control unit 6 (indicating 6a and 6c) and transmits the memory access request to all the system controllers SC. The broadcast transmitting and receiving unit 5 receives memory access requests from the other system controller SC and outputs the memory access requests to the snoop control unit 6. In other words, the broadcast transmitting and receiving unit 5 broadcasts the memory access requests issued by the CPU 1 and the IO device 2 managed by the system controller SC, on which the broadcast transmitting and receiving unit 5 is mounted, to the snoop control units 6 in all the system controllers SC.

When the snoot control unit 6 receives the memory access requests, the snoop control unit 6 executes snoop processing for detecting a state of the cache lines of the cache memory 11 in the CPU 1 managed by the system controller SC on which the snoop control unit 6 is mounted (whether data requested by the memory access request is present in the cache lines of the cache memory 11) and a state of resources used for data transfer (a control bus, an address bus, and a data bus for a chip select signal, a read/write control signal, and the like sent to the cache memory) and selecting a status of each of the cache memories 11 with respect to the data requested by the memory access requests (object data).

The snoop control unit 6 notifies the other snoop control units 6 of the status of each of the cache memories 11 selected by the snoop processing as a snoop processing result, merges statuses of all the cache memories 11 in the apparatus to determine a final status, and executes memory access start processing for starting memory access processing for inter-memory data transfer between the cache memories 11 or between the cache memory 11 and the main memory 3 based on the determined status.

FIG. 4 is a diagram of types of statuses selected by the snoop control unit 6 in the snoop processing and selection conditions. In the present invention, five kinds of statuses, i.e., "BUSY", "HIT", "HIT & BUSY", "MISS & BUSY", and "MISS" are defined.

"BUSY" is a status indicating that it cannot be specified at the present point whether object data of an object memory access request is present in the cache memory 11. When the object data of the object memory access request and object data of a memory access request set as an object of memory access start processing and memory access processing, i.e., a memory access request issued before the object memory access request and set as an object of the memory access start processing and the memory access processing (a prior memory access request) conflict with each other (when the object data of the object memory access request and the object data of the prior memory access request are present in an identical cache line), a state of the cache lines of the cache memory 11 changes according to the memory access processing for the prior memory access request. Therefore, it cannot be specified at the present point in which of the cache memories 11 the object data of the object memory access request is present. Therefore, a selection condition for "BUSY" is that the object data of the object memory access request and the object data of the prior memory access request conflict with each other.

"HIT" is a status indicating that data usable as the object data of the object memory access request is present in the cache memory 11. When the object data of the object memory access request and the object data of the prior memory access request do not conflict with each other (not "BUSY"), the object data of the object memory access request is present in a sub-block of the cache memory 11, and the resources for data transfer are not exhausted, data of the cache memory 11 can be transferred. Therefore, a selection condition for "HIT" is that the object data of the object memory access request and the object data of the prior memory access request do not conflict with each other, the object data of the memory access request is present in the cache memory 11, and the resources for data transfer are not exhausted. The exhaustion of the resources for data transfer means a state in which the cache memory 11 is accessed by the memory access processing for the prior memory access request and the object data of the object memory access request cannot be accessed.

"HIT & BUSY" is a status indicating that the object data of the object memory access request is present in the cache memory 11 but the data cannot be transferred. Even when the object data of the object memory access request and the object data of the prior memory access request do not conflict with each other (not "BUSY") and the object data of the object memory access request is present in the cache memory 11, the data cannot be transferred if the resources for data transfer are exhausted. Therefore, a selection condition for "HIT & BUSY" is that the object data of the object memory access request and the object data of the prior memory access request do not conflict with each other, the object data of the memory access request is present in the cache memory 11, and the resources for data transfer are exhausted.

"MISS & BUSY" is a status indicating that the object data of the object memory access request is not present in the cache memory 11 at the present point but it is likely that the state of the cache memory 11 is changed by the memory access processing for the prior memory access request and the object data of the object memory access request is present in the cache memory 11.

When the prior memory access request is a shared fetch request for referring to the object data or an exclusive fetch request based on a premise that the object data is updated and a final status for the prior memory access request is not determined, it cannot be judged whether the data transfer between the cache memories 11 is performed or the data transfer from the main memory 3 to the cache memory 11 is performed.

As described above, the data transfer between the cache memories 11 is executed in cache line unit and the data transfer from the main memory 3 to the cache memory 11 is executed in entry units, and "number of bytes of an entry=number of bytes of a cache line×n", is set to hold. In the case of n=1, the number of bytes of an entry and the number of bytes of a cache line are identical. Therefore, even if the data transfer between the cache memories 11 is performed or even if the data transfer from the main memory 3 to the cache memory 11 is performed, a state of one cache line in the cache memory 11 is merely changed.

However, in the case of n≠1, the number of bytes of an entry is larger than the number of bytes of a cache line. For example, in the case of n=4, when the data transfer from the main memory 3 to the cache memory 11 is performed according to the prior memory access request, data is transferred from the main memory 3 to the four cache lines. Therefore, it is likely that the object data of the object memory access request is present in one of the cache lines. In other words, when the object data of the object memory access request is present in an entry identical with an entry of the object data of the prior memory access request, it is likely that the data conflict with each other.

"MISS & BUSY" is a status that is present only when the number of bytes of an entry is set larger than the number of bytes of a cache line. A selection condition for "MISS & BUSY" is that the object data of the object memory access request and the object data of the prior memory access request do not conflict with each other, the object data of the memory access request is not present in the cache memory 11, and it is likely that the object data of the object memory access request is present in the cache memory depending on the final status of the prior memory access request.

"MISS" is a status indicating that it is necessary to transfer data from the main memory 3. In other words, "MISS" is a status indicating that the object data of the object memory access request and the object data of the prior memory access request do not conflict with each other (not "BUSY") and the object data of the prior memory access request is not present in the cache memory 11 at the present point. Therefore, a selection condition for "MISS" is that the object data of the object memory access request and the object data of the prior memory access request do not conflict with each other, the object data of the memory access request is not present in the cache memory 11, and it is unlikely that the object data of the object memory access request is present in the cache memory depending on the final status of the prior memory access request.

When the snoop processing for selecting any one of the five statuses "BUSY", "HIT", "HIT & BUSY", "MISS & BUSY", and "MISS" for each of the cache memories 11 in the CPUs 1 managed by the system controllers SC, on which the snoop control units 6 are mounted, is finished, the snoop control unit 6 notifies the other snoop processing units of the selected status of each of the cache memories 11 as a snoop processing result. The snoop control unit 6 merges the statuses of all the cache memories 11 in the apparatus obtained from the snoop control unit 6 and the other snoop control units 6 and determines a final status.

Priority of the statuses is set to be highest in "BUSY", next highest in "HIT", third highest in "HIT & BUSY", fourth highest in "MISS & BUSY", and lowest in "MISS". Therefore, when "BUSY" is present in the statuses of the cache memories 11, the final status is "BUSY". When "BUSY" is not present and "HIT" is present in the statuses of the cache memories 11, the final status is "HIT". When "BUSY" and "HIT" are not present and "HIT & BUSY" is present in the statuses of the cache memories 11, the final status is "HIT & BUSY". When "BUSY", "HIT", and "HIT & BUSY" are not present and "MISS & BUSY" is present in the statuses of the cache memories 11, the final status is "MISS & BUSY". When all the statues of the cache memories 11 are "MISS", the final status is "MISS".

The snoop control unit 6 executes memory access start processing for starting memory access processing based on the determined final status and the memory access request. Specifically, as shown in FIG. 5, when the final status is "BUSY", "HIT & BUSY", or "MISS & BUSY", the snoop control unit 6 retries the snoop processing without depending on a type of the memory access request.

When the final status is "HIT" and the memory access request is the shared fetch request, the snoop control unit 6 starts memory access processing for requesting one of the cache memories 11, a status of which is "HIT", to perform data transfer.

Specifically, the snoop control unit 6 selects the CPU 1 having a shortest distance to the cache memory 11 of the CPU 1 that requests data and the CPU 1 having the cache memory 11, a status of which is "HIT". When the selected CPU 1 is the CPU 1 managed by the system controller SC on which the snoop control unit 6 is mounted, the snoop control unit 6 starts memory access processing for requesting the cache memory 11 to perform data transfer.

When the final status is "HIT" and the memory access request is the exclusive fetch request, the snoop control unit 6 starts memory access processing for requesting one of the cache memories 11, a status of which is "HIT", to perform data transfer and invalidating the other cache memories 11, a status of which is "HIT".

Specifically, the snoop control unit 6 selects the CPU 1 having a shortest physical distance to the CPU 1 that requests data (a transfer destination) and the CPU 1 having the cache memory 11, a status of which is "HIT", (a transfer source). When the selected CPU 1 is the CPU 1 managed by the system controller SC on which the snoop control unit 6 is mounted, the snoop control unit 6 starts memory access processing for requesting the cache memory 11 to perform data transfer by the cache lines that store the object data and "invalidating" cache line state information registered in the cache management table 9 in association with the cache lines of the other cache memories 11 that stores the object data. When the selected CPU 1 is not the CPU 1 managed by the system controller SC on which the snoop control unit 6 is mounted, the snoop control unit 6 starts memory access processing for "invalidating" cache line state information registered in the cache management table 9 in association with the cache lines of the cache memory that stores the object data.

When the final status is "HIT" and the memory access request is the store request, the snoop control unit 6 starts memory access processing for invalidating the cache memory 11, a status of which is "HIT", and storing the object data i the main memory 3.

Specifically, the snoop control unit 6 judges, based on and address included i the store request and an address space allocated to the main memory 3, whether the main memory 3 that stores object data of the store request is the main memory 3 managed by the system controller SC on which the snoop control unit 6 is mounted. When the main memory 3 that stores the object data of the store request is the main memory 3 managed by the system controller SC on which the snoop control unit 6 is mounted, the snoop control unit 6 stores the object data included in the store request in the main memory 3 and starts memory access processing for "invalidating" cache line information registered in association with the cache lines of the cache memory 11 that stores data of the address included in the store request. when the main memory 3 that stores the object data of the store request is not the main memory 3 managed by the system controller SC on which the snoop control unit 6 is mounted, the snoop control unit 6 starts memory access processing for "invalidating" cache line information registered in the cache management table 9 in association with the cache lines of the cache memory 11 that stores the data of the address included in the store request.

When the final status is "MISS" and the access memory request is the shared fetch request or the exclusive fetch request, the snoop control unit 6 starts memory access processing for reading the object data from the main memory.

Specifically, the snoop control unit 6 judges, based on an address included in the shared fetch request or the exclusive fetch request and the address space allocated to the main memory 3, whether the main memory 3 that stores object data of the shared fetch request or the exclusive fetch request is the main memory 3 managed by the system controller SC on which the snoop control unit 6 is mounted. When the main memory 3 that stores the object data of the shared fetch request or the exclusive fetch request is the main memory 3 managed by the system controller SC on which the snoop control unit 6 is mounted, the snoop control unit 6 starts memory access processing for requesting the main memory 3 to perform data transfer. When the final status is "MISS" and the memory access request is the store request, the snoop control unit 6 starts memory access processing for storing object data in the main memory 3.

Specifically, the snoop control unit 6 judges, based on an address included in the store request and the address space allocated to the main memory 3, whether the main memory 3 that stores object data of the store request is the main memory 3 managed by the system controller SC on which the snoop control unit 6 is mounted. When the main memory 3 that stores the object data of the store request is the main memory 3 managed by the system controller SC on which the snoop control unit 6 is mounted, the snoop control unit 6 starts memory access processing for storing the object data included in the store request in the main memory 3.

The CPU-request issuing unit 7 performs access control for the cache memory 11 in the CPU 1 according to the memory access processing started by the snoop control unit 6. The MS-access issuing unit 8 performs access control for the main memory according to the memory access processing started by the snoop control unit 6.

Figure 6:
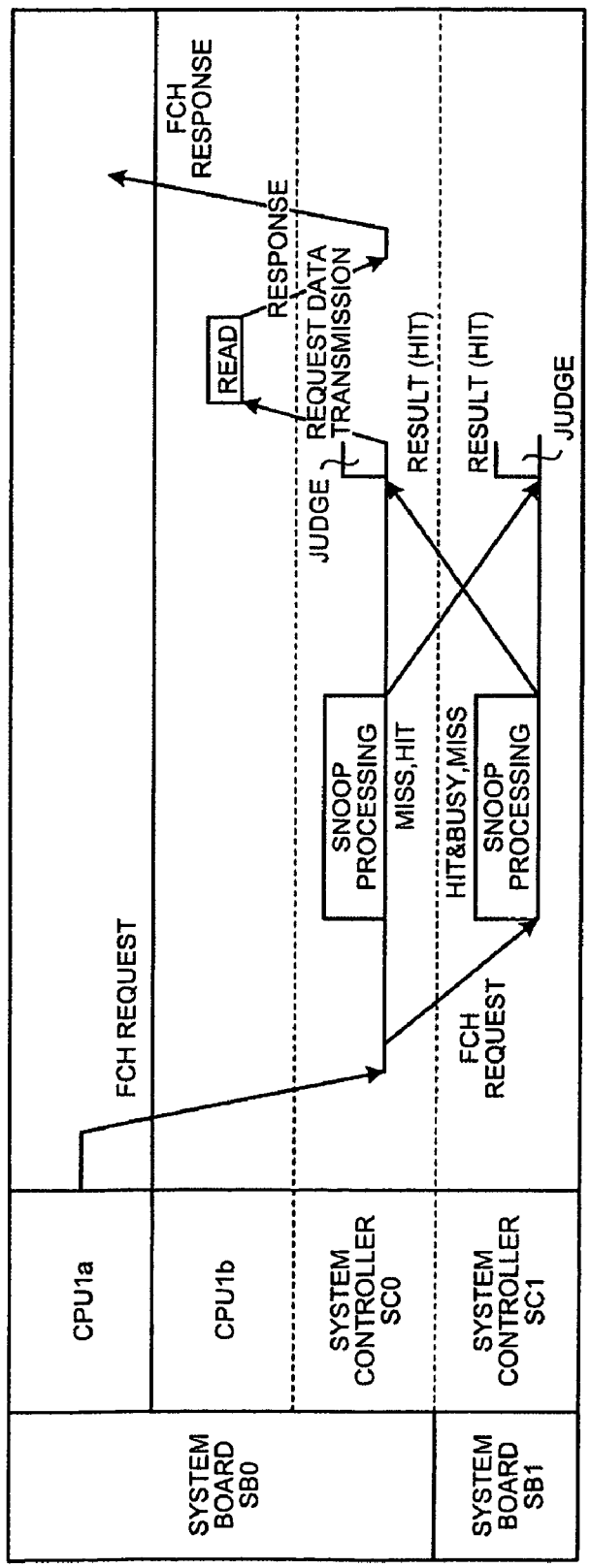
FIG. 6 is a sequence chart for explaining operations of an information processing apparatus in the present invention.

Operations performed by the information processing apparatus in the present invention when, for example, the CPU 1*a* issues an exclusive fetch request as a memory access request are explained referring to a sequence chart in FIG. 6, a flowchart in FIG. 7, and FIGS. 1 to 5.

When an exclusive fetch request (an FCH request) issued by the CPU 1*a* is received, the memory-access-request receiving unit 4*a* of the system controller SC0 outputs the received exclusive fetch request to the broadcast transmitting and receiving unit 5a. The broadcast transmitting and receiving unit 5a outputs the exclusive fetch request to the snoop control unit 6a and transmits the exclusive fetch request to the system controller SC1.

The snoop control unit 6a of the system controller SC0 executes snoop processing for detecting states of cache lines of the cache memories 11a and 11b of the CPUs 1a and 1b and states of resources used for data transfer and selecting statuses of the cache memories 11a and 11b.

Detailed operations of the snoop processing are explained referring to the flowchart in FIG. 7. The snoop control unit 6a selects a processing object cache memory set as an object of the processing from the cache memories 11a and 11b according to order decided in advance (step S100). It is assumed that the snoop control unit 6a selects the cache memory 11a as the processing object cache memory.

The snoop control unit 6a sets a memory access request (here, an exclusive fetch memory request) input from the broadcast transmitting and receiving unit 5a as an object memory access request and judges, based on the object memory access request and a prior memory access request to the cache memory 11a, whether there is a conflict with object data of the object memory access request (step S101).

Specifically, the snoop control unit 6a judges whether there is a conflict with the object data according to whether data indicated by an address included in the object memory access request and data indicated by an address included in the prior memory access request are data stored in an identical cache line. When the data indicated by the address included in the object memory access request and the data indicated by the address included in the prior memory access request are data stored in an identical cache line, the snoop control unit 6a judges that object data of the object memory access request and object data of the prior memory access request conflict with each other. When the data indicated by the address included in the object memory access request and the data indicated by the address included in the prior memory access request are not data stored in an identical cache line, the snoop control unit 6a judges that the object data of the object memory access request and the object data of the prior memory access request do not conflict with each other.

When it is judged based on the object memory access request and the prior memory access request to the cache memory 11a that there is a conflict with the object data of the object memory access request ("Yes" at step S101), the snoop control unit 6a selects "BUSY" as a status of the cache memory 11a (step S102).

When there is no conflict with the object data of the object memory access request ("No" at step S101), the snoop control unit 6a judges, based on the address included in the object memory access request and the cache management table 9a, whether the object data of the object memory access request is present in the cache memory 11a (step S103).

Specifically, for example, the snoop control unit 6a calculates an address space of the main memory 3 stored in the cache line from a start address of the main memory 3 and the number of bytes of a cache line registered in main memory information of the cache management table 9a in association with cache line information of the cache memory 11a and detects a cache line in which the address included in the object memory access request is included in the calculated address space. When the cache line information of the cache management table 9a is "valid" in association with the detected cache line, the snoop control unit 6a judges that object data requested by the object memory access request is present in the cache memory 11a. When the cache line information of the cache management table 9a is "invalid" in association with the detected cache line or when a cache line in which the address included in the object memory access request is included is not found in the calculated address space, the snoop control unit 6a judges that the object data requested by the object memory access request is not present in the cache memory 11a.

When the object data of the object memory access request is present in the cache memory 11a ("Yes" at step S103), the snoop control unit 6a judges, based on states of a control bus, an address bus, and a data bus for a chip select signal, a read/write signal, and the like of the cache memory 11a, whether the resources used for data transfer are exhausted (step S104). Specifically, for example, when the chip select signal of the cache memory 11a is assert, the snoop control unit 6a judges that the resources for data transfer are exhausted. When the chip select signal of the cache memory 11 is negate, the snoop control unit 6a judges that the resources for data transfer are not exhausted.

When the resources used for data transfer are exhausted ("Yes" at step S104), the snoop control unit 6a selects "HIT & BUSY" as a status of the cache memory 11a (step S105). When the resources used for data transfer are not exhausted ("No" at step S104), the snoop control unit 6a selects "HIT" as a status of the cache memory 11a (step S106).

On the other hand, when the object data of the object memory access request is not present in the cache memory 11a ("No" at step S103), the snoop control unit 6a judges whether it is likely that there is a conflict with the object data of the object memory access request depending on a final status of the prior memory access request (step S107). Specifically, the snoop control unit 6a judges whether the address included in the object memory access request is present in an entry of the address included in the prior memory access request, a final status of which is not determined, i.e., whether the object data of the prior memory access request and the object data of the object memory access request are data of an identical entry. When the address included in the object memory access request is present in the entry of the address included in the prior memory access request, a final status of which is not determined, the snoop control unit 6a judges that it is likely that there is a conflict with the object data of the object memory access request depending on a final status of the prior memory access request. When the address included in the object memory access request is not present in the entry of the address included in the prior memory access request, a final status of which is not determined, the snoop control unit 6a judges that it is unlikely that there is a conflict with the object data of the object memory access request depending on a final status of the prior memory access request.

When it is likely that there is a conflict with the object data of the object memory access request depending on a final status of the prior memory access request ("Yes" at step S107), the snoop control unit 6a selects "MISS & BUSY" as a status of the cache memory 11a (step S108). When it is unlikely that there is a conflict with the object data of the object memory access request depending on a final status of the prior memory access request ("No" at step S107), the snoop control unit 6a selects "MISS" as a status of the cache memory 11a (step S109).

After selecting the processing object cache memory (in this case, the cache memory 11a), the snoop control unit 6a judges whether there is an unprocessed cache memory (step S110). When there is an unprocessed cache memory, the snoop control unit 6a selects the unprocessed cache memory (in this case, the cache memory 11b) as a processing object cache memory and repeats the judgment for selecting a status for a processing object cache memory until it is judged that no unprocessed cache memory is left (steps S100 to S110).

After executing the snoop processing, the snoop control unit 6a notifies the snoop control unit 6c of a snoop processing result including cache memory identifiers for identifying the cache memories 11a and 11b and statuses of the cache memories 11a and 11b indicated by the cache memory identifiers.

On the other hand, when an exclusive fetch request transmitted from the memory-access-request receiving unit 4a of the system controller SC0 is received, the memory-access-request receiving unit 4c of the system controller SC1 outputs the received exclusive fetch request to the snoop control unit 6c. The snoop control unit 6c sets the received exclusive fetch request as an object memory access request and executes the snoop processing explained referring to the flowchart in FIG. 7. In other words, the snoop control unit 6c selects statuses of the cache memories 11c and 11d. The snoop control unit 6c notifies the snoop control unit 6a of a snoop processing result including cache memory identifiers for identifying the cache memories 11c and 11d and statuses of the cache memories 11c and 11d indicated by the cache memory identifiers.

In FIG. 5, the snoop control unit 6a selects "MISS" as a status of the cache memory 11a of the CPU 1a and selects "HIT" as a status of the cache memory 11b of the CPU 1b. The snoop control unit 6c selects "HIT & BUSY" as a status of the cache memory 11c of the CPU 1c and selects "MISS" as a status of the cache memory 11d of the CPU 1d.

The snoop control unit 6a or 6c merges the status selected by the snoop control unit and the status notified from the other and selects a final status. As described above, priority of the statuses is lower in order of "BUSY", "HIT", "HIT & BUSY", "MISS & BUSY", and "MISS". Therefore, in this case, the snoop control unit 6a or 6c selects the status "HIT" of the cache memory lib as the final status. Because the memory access request is the exclusive fetch request, the snoop control unit 6a starts memory access processing for requesting the cache lines of the cache memory 11b of the CPU 1b, which store the object data, to perform data transfer. Consequently, the object data is read out. The snoop control unit 6a transfers the read-out object data to the cache memory 11a of the CPU 1a as a response to the exclusive fetch request (an FCH response).

As explained above, in this embodiment, the statues for retrying the snoop processing include the two statuses, i.e., "BUSY" indicating the state in which the object data requested by the object memory access request conflicts with the object data requested by the prior memory access request and data transfer is impossible as the apparatus as a whole and "HIT & BUSY" indicating the state in which the object data requested by the object memory access request does not conflict with the object data requested by the prior memory access request, the object data requested by the memory access request is present in the cache memories managed by the system controller, and the resources for transferring the object data requested by the memory access request are exhausted, i.e., the state in which data transfer from the cache memories managed by the system controller is impossible. The priority of "HIT & BUSY" for determining the final status is set lower than that of "HIT" indicating that data transfer is possible. Therefore, even if data transfer is impossible in terms of an arbitrary system controller, when the other system controller can perform data transfer, it is possible to execute data transfer without retrying the snoop processing and it is possible to reduce the number of times of retry of the snoop processing and reduce processing time for the memory access request.

In this embodiment, when the number of bytes of an entry as a unit of data transfer from the main memories to the cache memories is larger than the number of bytes of a cache line as a unit of data transfer among the cache memories and the memory access request is the fetch request for requesting readout of the object data, the statuses for retrying the snoop processing further include the status "MISS & BUSY" indicating the state in which the object data requested by the memory access request does not conflict with the object data requested by the prior memory access request, the object data requested by the memory access request is not present in the cache memories managed by the system controller, and the object data requested by the memory access request is data in an entry identical with an entry of the object data of the prior memory access request, i.e., the state in which data transfer from the cache memories managed by the system controller is impossible. The priority of "MISS & BUSY" for determining the final status is set lower than that of "HIT" indicating that data transfer is possible. Therefore, when the number of bytes of an entry as a unit of data transfer from the main memories to the cache memories is larger than the number of bytes of a cache line as a unit of data transfer among the cache memories, even if data transfer is impossible in terms of an arbitrary system controller, when the other system controller can perform data transfer, it is possible to execute data transfer without retrying the snoop processing and it is possible to reduce the number of times of retry of the snoop processing and reduce processing time for the memory access request.

In FIG. 1, to simplify the explanation, the number of the CPUs, the IO devices, and the main memories mounted on the system board SB0 and the number of the CPUs, the IO devices, and the main memories mounted on the system board SB1 are identical. However, the number of these components can be different in each of the system boards.

According to an embodiment of the present invention, the statuses for retrying the snoop processing include the two statuses, i.e., "BUSY" indicating the state in which the object data requested by the object memory access request conflicts with the object data requested by the prior memory access request and data transfer is impossible as the apparatus as a whole and "HIT & BUSY" indicating the state in which the object data requested by the object memory access request does not conflict with the object data requested by the prior memory access request, the object data requested by the memory access request is present in the cache memories managed by the system controller, and the resources for transferring the object data requested by the memory access request are exhausted, i.e., the state in which data transfer from the cache memories managed by the system controller is impossible. The priority of "HIT & BUSY" for determining the final status is set lower than that of "HIT" indicating that data transfer is possible. Therefore, there is an effect that, even if data transfer is impossible in terms of an arbitrary system controller, when the other system controller can perform data transfer, it is possible to execute data transfer without retrying the snoop processing and it is possible to obtain a snoop control method that can reduce the number of times of retry of the snoop processing and reduce processing time for the memory access request.

According to an embodiment of the present invention, when the number of bytes of an entry as a unit of data transfer from the main memories to the cache memories is larger than the number of bytes of a cache line as a unit of data transfer among the cache memories and the memory access request is the fetch request for requesting readout of the object data, the statuses for retrying the snoop processing further include the status "MISS & BUSY" indicating the state in which the object data requested by the memory access request does not conflict with the object data requested by the prior memory access request, the object data requested by the memory access request is not present in the cache memories managed by the system controller, and the object data requested by the memory access request is data in an entry identical with an entry of the object data of the prior memory access request, i.e., the state in which data transfer from the cache memories managed by the system controller is impossible. The priority of "MISS & BUSY" for determining the final status is set lower than that of "HIT" indicating that data transfer is possible. Therefore, there is an effect that, when the number of bytes of an entry as a unit of data transfer from the main memories to the cache memories is larger than the number of bytes of a cache line as a unit of data transfer among the cache memories, even if data transfer is impossible in terms of an arbitrary system controller, when the other system controller can perform data transfer, it is possible to execute data transfer without retrying the snoop processing and it is possible to obtain a snoop control method that can reduce the number of times of retry of the snoop processing and reduce processing time for the memory access request.

According to an embodiment of the present invention, the statuses for retrying the snoop processing include the two statuses, i.e., "BUSY" indicating the state in which the object data requested by the object memory access request conflicts with the object data requested by the prior memory access request and data transfer is impossible as the apparatus as a whole and "HIT & BUSY" indicating the state in which the object data requested by the object memory access request does not conflict with the object data requested by the prior memory access request, the object data requested by the memory access request is present in the cache memories managed by the system controller, and the resources for transferring the object data requested by the memory access request are exhausted, i.e., the state in which data transfer from the cache memories managed by the system controller is impossible. The priority of "HIT & BUSY" for determining the final status is set lower than that of "HIT" indicating that data transfer is possible. Therefore, there is an effect that, even if data transfer is impossible in terms of an arbitrary system controller, when the other system controller can perform data transfer, it is possible to execute data transfer without retrying the snoop processing and it is possible to obtain an information processing apparatus that can reduce the number of times of retry of the snoop processing and reduce processing time for the memory access request.

According to an embodiment of the present invention, when the number of bytes of an entry as a unit of data transfer from the main memories to the cache memories is larger than the number of bytes of a cache line as a unit of data transfer among the cache memories and the memory access request is the fetch request for requesting readout of the object data, the statuses for retrying the snoop processing further include the status "MISS & BUSY" indicating the state in which the object data requested by the memory access request does not conflict with the object data requested by the prior memory access request, the object data requested by the memory access request is not present in the cache memories managed by the system controller, and the object data requested by the memory access request is data in an entry identical with an entry of the object data of the prior memory access request, i.e., the state in which data transfer from the cache memories managed by the system controller is impossible. The priority of "MISS & BUSY" for determining the final status is set lower than that of "HIT" indicating that data transfer is possible. Therefore, there is an effect that, when the number of bytes of an entry as a unit of data transfer from the main memories to the cache memories is larger than the number of bytes of a cache line as a unit of data transfer among the cache memories, even if data transfer is impossible in terms of an arbitrary system controller, when the other system controller can perform data transfer, it is possible to execute data transfer without retrying the snoop processing and it is possible to obtain an information processing apparatus that can reduce the number of times of retry of the snoop processing and reduce processing time for the memory access request.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A snoop control method applied to an information processing apparatus including main memories and system controllers connected to CPUs having cache memories, the snoop control method of the system controller comprising:

receiving a memory access request from any of the CPUs and notifying other system controllers of the memory access request;

judging, when the memory access request from any of the CPUs for each of the cache memories in the CPU is received, for each of the cache memories, whether object data requested by the memory access request conflicts with object data requested by a prior access request received earlier than the memory access request, whether resources for transferring the object data requested by the memory access request are exhausted, and whether the object data requested by the memory access request is present in any of the cache memories;

selecting a first status as a status of the cache memory, when it is judged at the judging that the object data requested by the memory access request conflicts with the object data requested by the prior access request, and selecting a second status as a status of the cache memory, when it is judged at the judging that the object data requested by the memory access request does not conflict with the object data requested by the prior access request, the resources for transferring the object data requested by the memory access request are not exhausted, and the object data requested by the memory access request is present in any of the cache memories;

notifying the other system controller of a snoop processing result in which the status selected at the selecting and the cache memory are associated; and setting a final status as a first final status for retrying a snoop processing, when the first status is present in statuses of the cache memories, and setting the final status as a second final status for without retrying the snoop processing, when the first status is not present in statuses of the cache memories and the second status is present in statuses of the cache memories.

2. The snoop control method according to claim 1, wherein when a data size of an entry as a unit of data transfer from the main memories to the cache memories is larger than a data size of a cache line as a unit of data transfer among the cache memories, the judging further includes judging whether the object data requested by the memory access request and the object data of the prior memory access request are data in an identical entry.

3. An information processing apparatus including main memories and system controllers connected to CPUs having cache memories, each of the system controllers comprising:
- a broadcast transmitting and receiving unit that receives a memory access request from each of the CPU and notifies the memory access request to the other system controllers; and
- a snoop control unit that judges when the memory access request from any of the CPUs for each of the cache memories in the CPU is received, for each of the cache memories, whether object data requested by the memory access request conflicts with object data requested by a prior access request received earlier than the memory access request, whether resources for transferring the object data requested by the memory access request are exhausted, and whether the object data requested by the memory access request is present in any of the cache memories, selects a first status as a status of the cache memory, when it is judged that the object data requested by the memory access request conflicts with the object data requested by the prior access request, selects a second status as a status of the cache memory, when it is judged that the object data requested by the memory access request does not conflict with the object data requested by the prior access request, the resources for transferring the object data requested by the memory access request are not exhausted, and the object data requested by the memory access request is present in any of the cache memories, notifies the other system controller of a snoop processing result in which the status selected at the selecting and the cache memory are associated, sets a final status as a first final status for retrying a snoop processing, when the first status is present in statuses of the cache memories, and sets the final status as a second final status for without retrying the snoop processing, when the first status is not present in statuses of the cache memories and the second status is present in statuses of the cache memories.

4. The information processing apparatus according to claim 3, wherein
when a data size of bytes of an entry as a unit of data transfer from the main memories to the cache memories is larger than a data size of a cache line as a unit of data transfer among the cache memories,
the snoop control unit judges whether the object data requested by the memory access request and the object data of the prior memory access request are data in an identical entry.

5. A system controller connected to a main memory and CPUs having cache memories, the system controller comprising:
- a broadcast transmitting and receiving unit that receives a memory access request from each of the CPU and notifies the memory access request to the other system controllers; and
- a snoop control unit that judges when the memory access request from any of the CPUs for each of the cache memories in the CPU is received, for each of the cache memories, whether object data requested by the memory access request conflicts with object data requested by a prior access request received earlier than the memory access request, whether resources for transferring the object data requested by the memory access request are exhausted, and whether the object data requested by the memory access request is present in any of the cache memories, selects a first status as a status of the cache memory, when it is judged that the object data requested by the memory access request conflicts with the object data requested by the prior access request, selects a second status as a status of the cache memory, when it is judged that the object data requested by the memory access request does not conflict with the object data requested by the prior access request, the resources for transferring the object data requested by the memory access request are not exhausted, and the object data requested by the memory access request is present in any of the cache memories, notifies the other system controller of a snoop processing result in which the status selected at the selecting and the cache memory are associated, sets a final status as a first final status for retrying a snoop processing, when the first status is present in statuses of the cache memories, and sets the final status as a second final status for without retrying the snoop processing, when the first status is not present in statuses of the cache memories and the second status is present in statuses of the cache memories.

6. The system controller according to claim 5, wherein
when a data size of bytes of an entry as a unit of data transfer from the main memories to the cache memories is larger than a data size of a cache line as a unit of data transfer among the cache memories,
the snoop control unit judges whether the object data requested by the memory access request and the object data of the prior memory access request are data in an identical entry.

* * * * *